United States Patent
Shiohara (10) Patent No.: US 6,808,058 B2
(45) Date of Patent: Oct. 26, 2004

(54) ARTICLE JOINING CONTROL METHOD

(75) Inventor: Akira Shiohara, Gamo-gun (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 10/047,208

(22) Filed: Jan. 14, 2002

(65) Prior Publication Data

US 2002/0112938 A1 Aug. 22, 2002

(30) Foreign Application Priority Data

Feb. 2, 2001 (JP) .................................... 2001-026193

(51) Int. Cl.[7] ............................................... B65G 47/10
(52) U.S. Cl. .................................... 198/357; 198/358
(58) Field of Search ................................ 198/357, 358, 198/347.4

(56) References Cited

U.S. PATENT DOCUMENTS

| | | | | |
|---|---|---|---|---|
| 3,011,621 A | * | 12/1961 | Byrnes et al. | 198/358 |
| 3,122,231 A | * | 2/1964 | Pence et al. | 198/347.4 |
| 3,279,581 A | * | 10/1966 | Drennan | 198/358 |
| 5,860,504 A | * | 1/1999 | Lazzarotti | 198/357 |
| 6,129,199 A | * | 10/2000 | Gretener et al. | 198/357 |

FOREIGN PATENT DOCUMENTS

WO    WO 99 67159 A    12/1999

* cited by examiner

*Primary Examiner*—Joseph Valenza
(74) *Attorney, Agent, or Firm*—Reising, Ethington, Barnes, Kisselle, P.C.

(57) ABSTRACT

On a main line (2), when an empty space (cutting-out space s) equal to or greater than a predetermined length is detected between lots of articles (1) or between articles (1) being conveyed, this detected empty space is reserved for an article arrival line (3) on which articles (1) are stored. When this empty space approaches a junction with the article arrival line (3) for which the empty space is reserved, articles (1) corresponding to the length of the reserved empty space are cut out from this article arrival line (3) to the main line (2). This method allows it to reduce empty spaces in which articles (1) are not conveyed on the main line (2), increase the joining efficiency, reduce the frequency of storage of articles (1) on the article arrival line (3), and reduce the waiting time for loading articles (1) to the article arrival line (3), thereby increasing the efficiency of the loading of articles (1).

6 Claims, 6 Drawing Sheets

ARTICLE JOINING CONTROL METHOD

FIELD OF INVENTION

The present invention relates to an article joining control method for conveying and joining articles from a plurality of auxiliary conveyance paths to a single main conveyance path.

BACKGROUND OF THE INVENTION

A publicly known article joining control method allocates a given empty space in a main conveyance path to an auxiliary conveyance path for each passage of given time, and articles stored on the auxiliary conveyance path are joined to the empty space in the main conveyance path. The empty space is defined as a spacing between articles or groups (hereinafter referred to as lots) of articles in a main line. In this joining control method, the given empty space has a given length established when articles stored on the auxiliary conveyance path come to full amount, the space being allotted irrespective of the amount of articles stored on the auxiliary conveyance path.

In another publicly known article joining control method, when there is in the main conveyance path only an empty space which is shorter than the amount (length) of the articles stored on the auxiliary conveyance path, the articles are not jointed to that empty space but to an empty space allocated between the articles or rearwardly of the lot of articles.

With the publicly known article joining control method, however, there occurs the following problem.

In the publicly known article joining control method which allocates a given empty space, since a space corresponding to the length established at the time of full amount is allotted in order for article joining irrespective of the amount of articles stored, empty spaces with no articles being conveyed therein are formed on the main conveyance path, presenting a problem that the joining efficiency is low.

Further, when there is on the main conveyance path only an empty space which is shorter than the amount of articles stored on the auxiliary conveyance path, the publicly known article joining control method which does not allow article joining to such empty space presents a problem that many empty spaces are formed, lowering the joining efficiency. Further, since storage of articles occurs in the auxiliary conveyance path, waiting time is involved in carrying articles into the auxiliary conveyance path, presenting a problem that the operating efficiency lowers.

DISCLOSURE OF THE INVENTION

Accordingly, an object of the invention is to solve these problems and provide an article joining control method which reduces empty spaces on a main conveyance path to increase joining efficiency, thus increasing operating efficiency.

To achieve this object, the invention provides an article joining control method for joining articles, carried into and stored in a plurality of auxiliary conveyance paths, from the auxiliary conveyance paths to a main conveyance path conveying articles, in which when a spacing equal to our greater than a predetermined length is found between articles or between groups of articles being conveyed on the main conveyance path, the stored articles which correspond to the length of the spacing are cut out from the auxiliary conveyance, paths to the main conveyance path characterized in that when the articles have been cut out from each auxiliary conveyance path for joining, a spacing is created on the auxiliary conveyance path prior to next carrying in of articles.

According to such method, the empty spacing in which no article is conveyed on the main conveyance path is reduced to increase joining efficiency and the stored amount of articles on the auxiliary conveyance paths is reduced to reduce waiting time for loading operation, thereby increasing article loading efficiency.

DESCRIPTION OF EMBODIMENTS

An article joining control method according to an embodiment of the invention will now be described with reference to FIGS. 1–5.

A conveyance system utilizing an article joining control method according to the invention comprises a main line (an example of a main conveyance path) 2 for conveying articles 1, and a plurality (four in the figures) of article arrival lines (an example of auxiliary conveyance paths) 3 (3A, 3B, 3C, 3D) for joining articles 1 to the main line 2.

The main line 2 is composed of a roller conveyor. Further, the main line 2 is provided with an upstream passage sensor 5 located upstream of junctions of the four article arrival lines 3. The upstream passage sensor 5 is used for detecting the length of articles 1 being conveyed by the main line 2, in the direction of conveyance, and is composed of a photoelectric sensor. Further, a drive motor 6 for the roller conveyor has a rotary encoder 7 connected thereto.

The articles 1 being conveyed by the main line 2 are usually conveyed in lots each consisting of a plurality of articles 1, and the spacing between the lots (or the spacing corresponding to an article 1 when the lot consists of a single article 1) is equal to or greater than a preset spacing z. This spacing z is the minimum length (e.g., 1 m) of the spacing between the lots (hereinafter refereed to as lot spacing). The set spacing z will be hereinafter referred to as minimum set spacing z. Further, the spacing (clearance) between articles 1 in the lots is shorter than this minimum set spacing z.

Each of the article arrival lines 3A, 3B, 3C and 3D comprises a cutting-out device (storing/carrying-out means) 11 for successively storing articles 1 at predetermined spaced intervals and carrying out stored articles 1 in response to a predetermined carrying-out signal (to be later described) to the main line 2, and a carrying-in conveyor (article carrying-in means) 12 disposed upstream of the cutting-out device 11 for carrying articles 1 into the cutting-out device 11.

Each cutting-out device 11 is composed of high speed accumulating conveyor device. Further, each cutting-out device 11 is provided with a leading sensor 14 located at the most downstream position for detecting articles 1, a full-amount sensor 15 located at the most upstream position for detecting articles 1, an article detecting sensor 16 located between the leading sensor 14 and the full-amount sensor 15 for detecting articles 1 at given spaced intervals, and a controller 17 (FIG. 2) for controlling the driving of the cutting-out device 11. These sensors 14, 15 and 16 are each composed of a photoelectric sensor.

The controller 17 of each the cutting-out device 11 successively stores articles 1 carried in from the carrying-in conveyor 12 at predetermined spaced intervals, in response to article detection signals from one of the sensors 14, 15 and 16 which corresponds thereto, and carries out the articles 1 to the main line 2 by cutting them out by an amount corresponding to the number of articles 1 inputted by a predetermined carrying-out signal (to be later described). Further, the controller 17 outputs the following signals and data.

1. An arrival signal which, when articles 1 are detected by the leading sensor 14, reports that articles 1 arrive at the most downstream position in the cutting-out device 11, that is, the articles 1 to be joined arrive and are stored.

2. A full-amount signal which, when articles 1 are detected by the full-amount sensor 15, reports that the cutting-out device 11 is full of articles 1.

3. An articles number data consisting of a storage length N, which reports the amount of the stored articles 1 on the basis of the number of article detection sensors 16 that have detected articles 1, that is, the connected length of the currently stored articles 1 (hereinafter referred to as the storage length).

Figure 1:
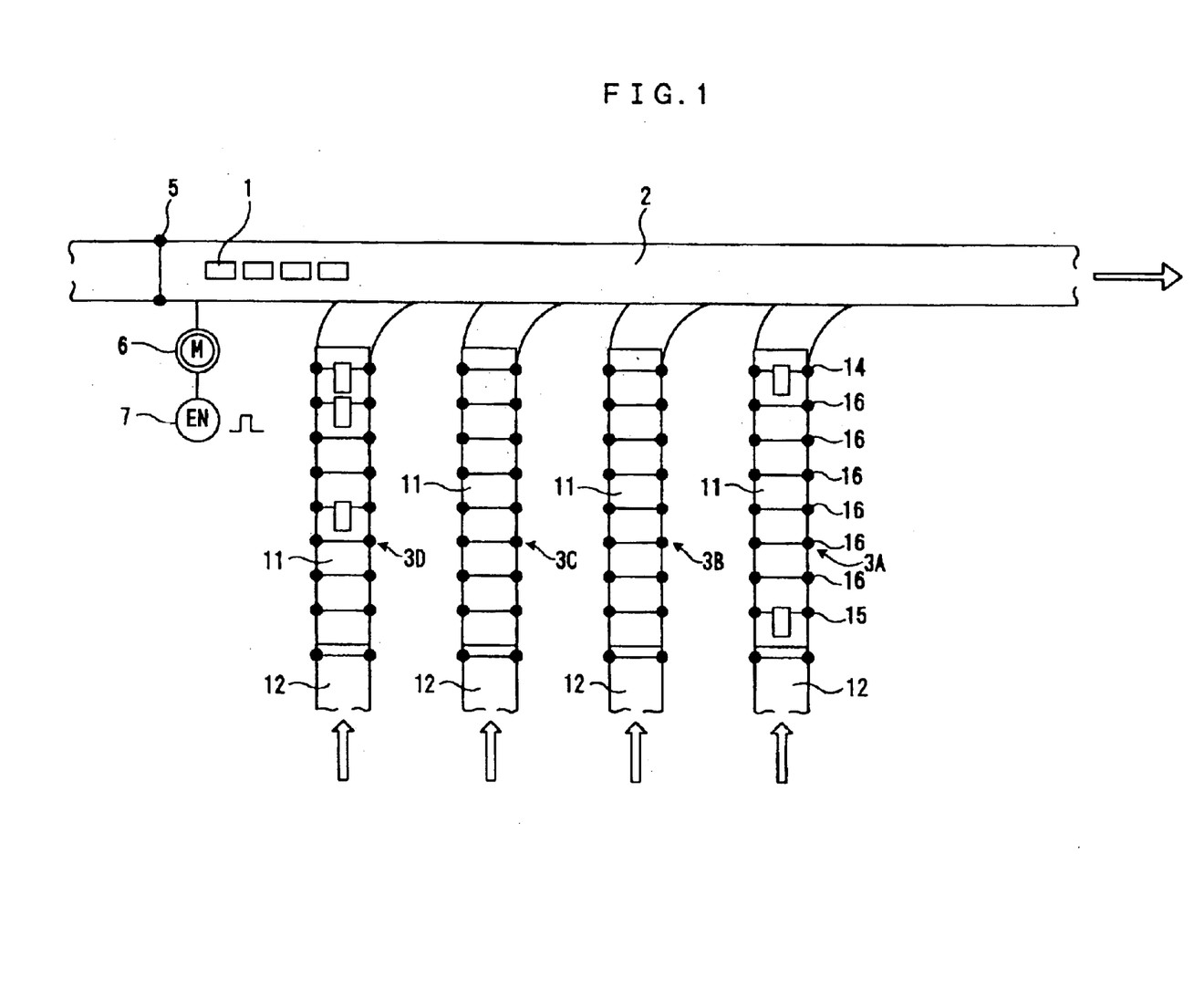
FIG. 1 is an arrangement diagram of a conveyance system using an article joining control method according to an embodiment of the invention.
Figure 2:
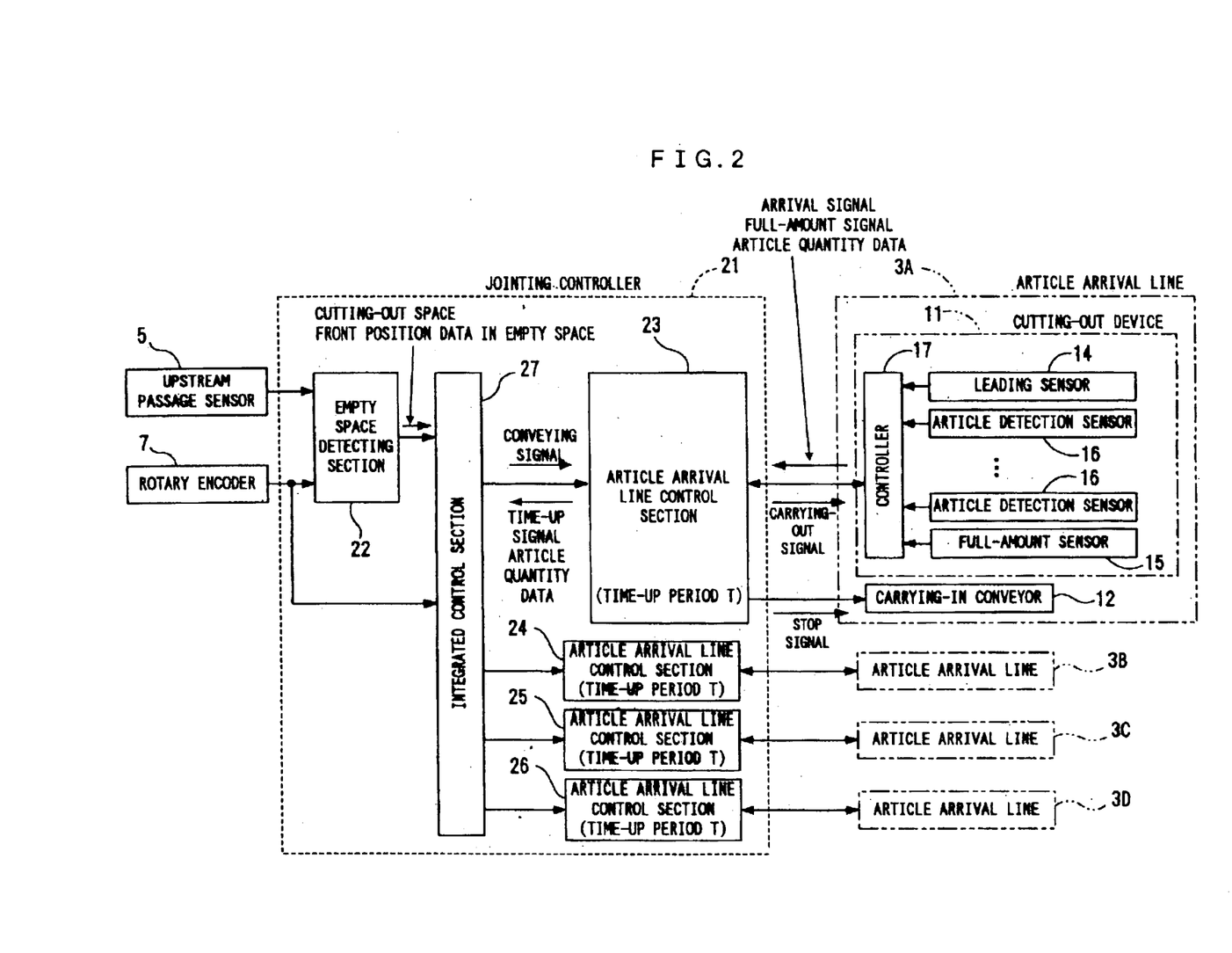
FIG. 2 is a control arrangement diagram of the conveyance system.

A control block diagram of the arrangement is shown in FIG. 2.

In FIG. 2, the numeral 21 denotes a joining controller for controlling the joining of articles 1 from four article arrival lines 3A, 3B, 3C and 3D to the main line 2. The joining controller 21 is composed of a computer. Connected to this joining controller 21 are the upstream passage sensor 5 and the rotary encoder 7, and also connected to this joining controller are the controller 17 and the carrying-in conveyor 12 of the cutting-out device 11 in each article arrival line 3.

Further, as shown in FIG. 2, the joining controller 21 comprises an empty space detecting section 22, article arrival line control sections 23, 24, 25 and 26 respectively corresponding to the article arrival lines 3A, 3B, 3C and 3D, and an integrated control section 27 for integrally controlling the empty space detecting section 22 and article arrival line control sections 23, 24, 25 and 26. The sections 22-27 will be described in detail.

A. Empty Space Detecting Section 22

Connected to this empty space detecting section 22 are the upstream passage sensor 5 and the rotary encoder 7. The empty space detecting section 22 detects a lot spacing which is equal to or greater than a predetermined length (hereinafter referred to as empty space) from among the lot spacings. The empty space detecting operation using the empty space detecting section 22 will be described with reference to the flowchart of FIG. 3. In addition, the empty space detecting section 22 has set therein in advance a maximum storage length p in the cutting-out device 11 in the article arrival line, and the minimum length (minimum storage length) j of article 1 being carried into the cutting-out device 11 of the article arrival line.

Figure 3:
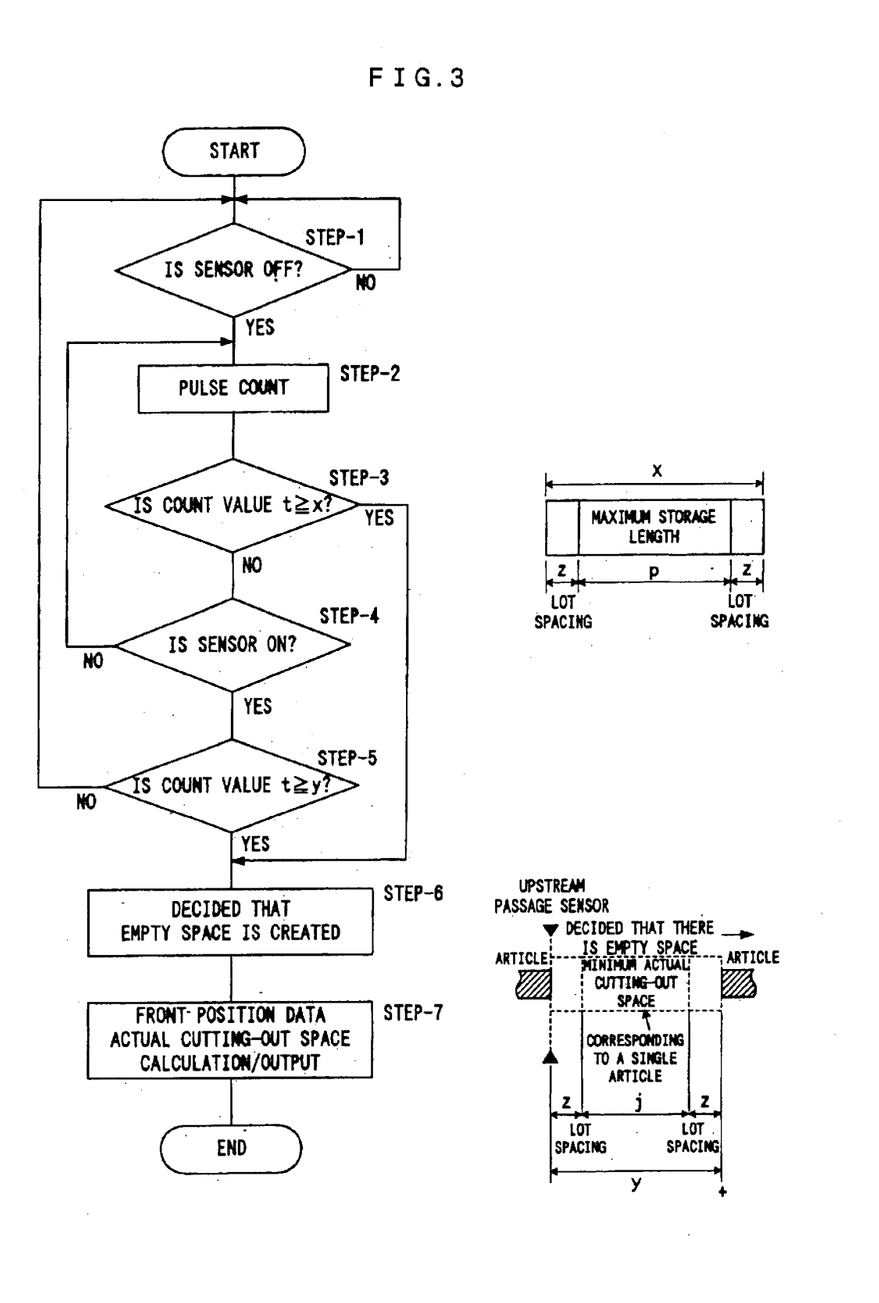
FIG. 3 is a flowchart explaining the operation of an empty space detecting section of a joining controller in the conveyance system.

When the upstream passage sensor 5 is turned off to stop detecting the passage of articles 1, that is, when a clearance is formed between articles 1 (step-1), counting of output pulses from the rotary encoder 7 is started (step-2).

Then, the number of pulses x (=p+2z) corresponding to the maximum storage length p plus the minimum set spacings z before and behind the same is found, and whether a count value t of the output pulses is equal to or greater than the number of pulses x is checked (step-3). When the count number t is less than the number of pulses x, whether the upstream passage sensor 5 is turned on is checked (step-4), and if it is not turned on, the control returns to step-2 to continue counting.

When the upstream passage sensor 5 is ascertained to be on, the number of pulses y (=j+2z) corresponding to the minimum storage length j plus the minimum set spacings z before and behind the same (a predetermined length defined in Claims) is found, and whether the count value t is equal to or greater than this number of pulses y is checked (step-5). Checking whether the count value t is equal to or greater than the number of pulses y makes it possible to decide whether the detected clearance between articles 1 is a clearance between articles 1 in a lot or an empty space which can allow articles 1 to be joined thereto from the cutting-out device 11.

When the count value t is equal to or greater than the number of pulses y, or when the count number t is equal to or greater than the number of pulses x at step-3, it is decided that there is an empty space between lots which can allow articles 1 to be joined thereto from the cutting-out device 11 (step-6). Subsequently, the number of pulses corresponding to the minimum set spacings z before and behind is subtracted from the count value t to find the cutting-out space s (=t−2z) which can allow articles 1 to be actually cut out to this empty space, and the cutting-out spacing s and the count value t (the downstream position t of the upstream passage sensor 5) corresponding to a front position data of the empty space represented by the coordinate on the main line 2 are outputted to the integrated control section 27 (step-7).

Thus, in the empty space detecting section 22, the upstream passage sensor 5 is turned off, and the pulses from the rotary encoder 7 are counted until the sensor is turned on again, whereby the clearance between articles 1 is found. And it is decided whether the clearance between articles 1 thus found is a clearance between articles in a lot or an empty space which can allow articles 1 to be joined thereto. And if it is decided to be an empty space which can allow articles 1 to be joined thereto, the count value t is decided to be the length of the empty space, and the actual cutting-out space s (=t−2z) and the front position data t of the empty space are found and outputted to the integrated control section 27. Further, when the upstream passage sensor 5 does not detect articles 1 for a long time (when articles 1 are not being conveyed in the main line 2) and the count value t becomes equal to or greater than the number of pulses x which corresponds to the maximum storage length p plus the minimum set spacings z before and behind the same, it is decided that an empty space which can allow articles 1 to be joined thereto has been formed. Similarly, the actual cutting-out space s and the front position data t of the empty space are found and outputted to the integrated control section 27.

B. Article Arrival Line Control Sections 23, 24, 25 and 26

The article arrival line control sections 23, 24, 25 and 26 each has the controller 17 of the cutting-out device 11 of the article arrival line 3 and the carrying-in conveyor 12 respectively connected thereto, and inputted with the arrival signal, the full-amount signal and the storage N (article quantity data) all from the controller 17 of each corresponding cutting-out device 11.

The article arrival line control sections 23, 24, 25 and 26 each has three functions.

First function: Function of a timer. Further, a time-up period T for the timer has already been set, and when the arrival signal is inputted, the timer starts to count time. Upon a lapse of the preset time-up period T, a time-up signal and the storage length N inputted at this time are outputted to the integrated control section 27.

Second function: When a carrying-out signal (to be later described in detail) including a cutting-out length L for actually carrying out articles 1 to the main line 2 is inputted from the integrated control section 27, this carry-out signal is outputted to the controller 17 of the cutting-out device 11.

Third function: Function of an off-delay timer. When the full-amount signal or carrying-out signal from the integrated control section 27 is turned on, a stop signal is outputted to the conveyor 12. When the full-amount signal and the carrying-out signal are turned off, the stop signal is turned off after a delay of a given time set in the off-delay timer.

C. Integrated Control Section 27

The integrated control section 27 is inputted with the cutting-out space s and the front position data t of the empty space from the empty space detecting section 22, and with the time-up signal and the storage length N from each of the article arrival line control sections 23, 24, 25 and 26. Further, the integrated control section 27 is connected with the passage sensor 4 and the rotary encoder 7.

The operation of the integrated control section 27 will now be described according to the flowchart of FIG. 4.

a. Each time the cutting-out spaces and the front position data t of the empty space are inputted, a flowchart of FIG. 4(a) is executed.

Figure 4A:
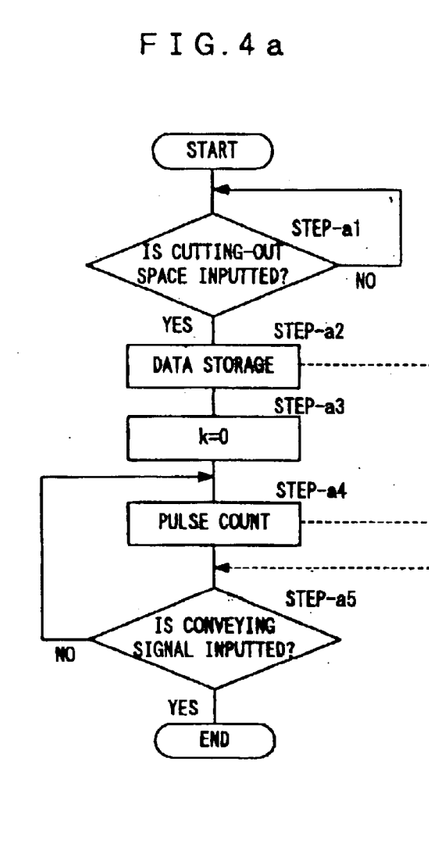
FIG. 4 is a flowchart explaining the operation of an integrated control section of the joining controller in the conveyance system.

As shown in FIG. 4(a), when the cutting-out space s and the front position data t of the empty space are inputted (step-a1), the inputted cutting-out space s and front position data t of the empty space are stored (step-a2) and a count value k to be later described is reset (step-a3).

Figure 4B:
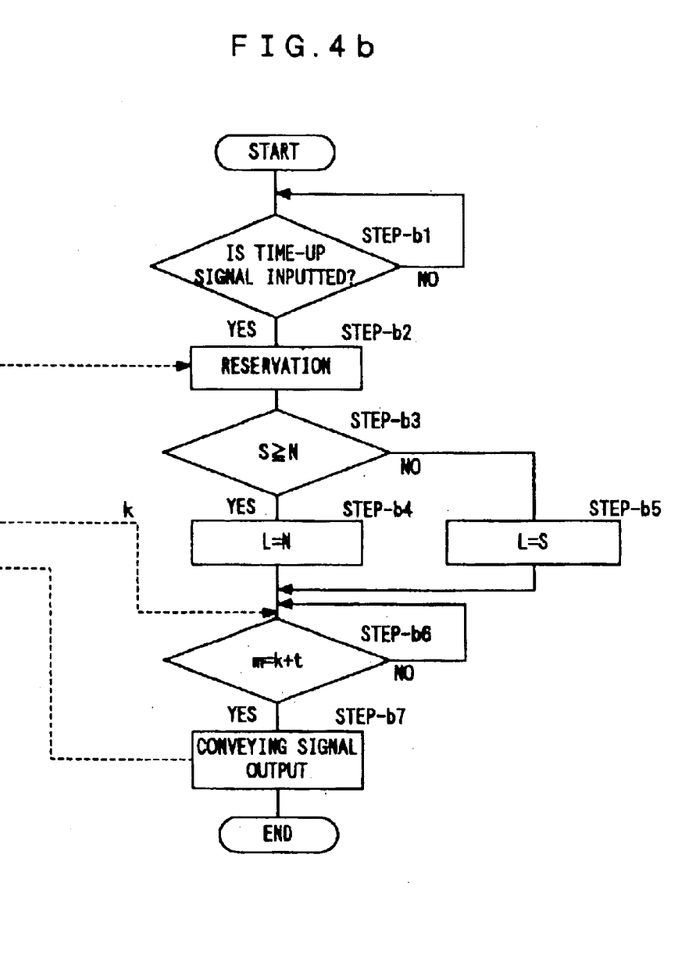

And counting of pulses from the rotary encoder 7 is started (step-a4). This count value is set as k. When a carrying-out signal to be later described is inputted (step-a5), the counting of pulses from the rotary encoder 7 is terminated.

b. Each time a time-up signal and article quantity data are inputted from the article arrival line control sections 23, 24, 25 and 26, a flowchart of FIG. 4(b) is executed.

When the time-up signal and storage length N are inputted from any of the article arrival line control sections 23, 24, 25 and 26 (step-b1), the cutting-out space s is distributed (reserved) among the article arrival line control sections 23, 24, 25 and 26 that have outputted the time-up signal and storage length N (step-b2).

Suppose that a reservation is made in the article arrival line control section 23. At present, the front of the empty space is at a position of (t+k) expressed in number of pulses. Coordinates m of the empty space (coordinates of the main line 2) allowing the article 1 to be joined thereto from the article arrival line 3 at a position of the number of pulses corresponding to the minimum set spacing z from the rearmost end of the lot immediately in front of the empty space (including the reserved cutting-out space s) is previously obtained upstream of the junction of the article arrival line 3 according to conveying speeds of the article arrival line 3 and the main line 2, and is set based on the number of pulses from the upstream passage sensor 5. When an empty space (including the reserved cutting-out space s) arrives at this number of pulses, m, articles 1 from the article arrival line 3 are cut out, whereupon the articles 1 are joined to the reserved cutting-out space s.

Subsequently, the inputted storage length N is compared with the cutting-out space s to check whether the cutting-out space s is equal to or greater than the storage length N (step-b3). When the result is in the affirmative, the storage length N is set as the cutting-out length L (=N) to actually carry out the articles 1 to the main line 2 (step-b4).

Further, when the cutting-out space s is less than the storage length N, the cutting-out space s is set as the cutting-out length L (=s) (step-b5). In this case, the length which was unable to be cut out, that is, the articles 1 corresponding in amount to the length (N−s) are left on the article arrival line 3.

Subsequently, whether the number of pulses (t−k) equals the number of pulses m is checked (step-b6). When the result is in the affirmative, a carrying-out signal including the cutting-out length L is outputted to the reserved article arrival line control section 23 (step-b7).

Figure 5:
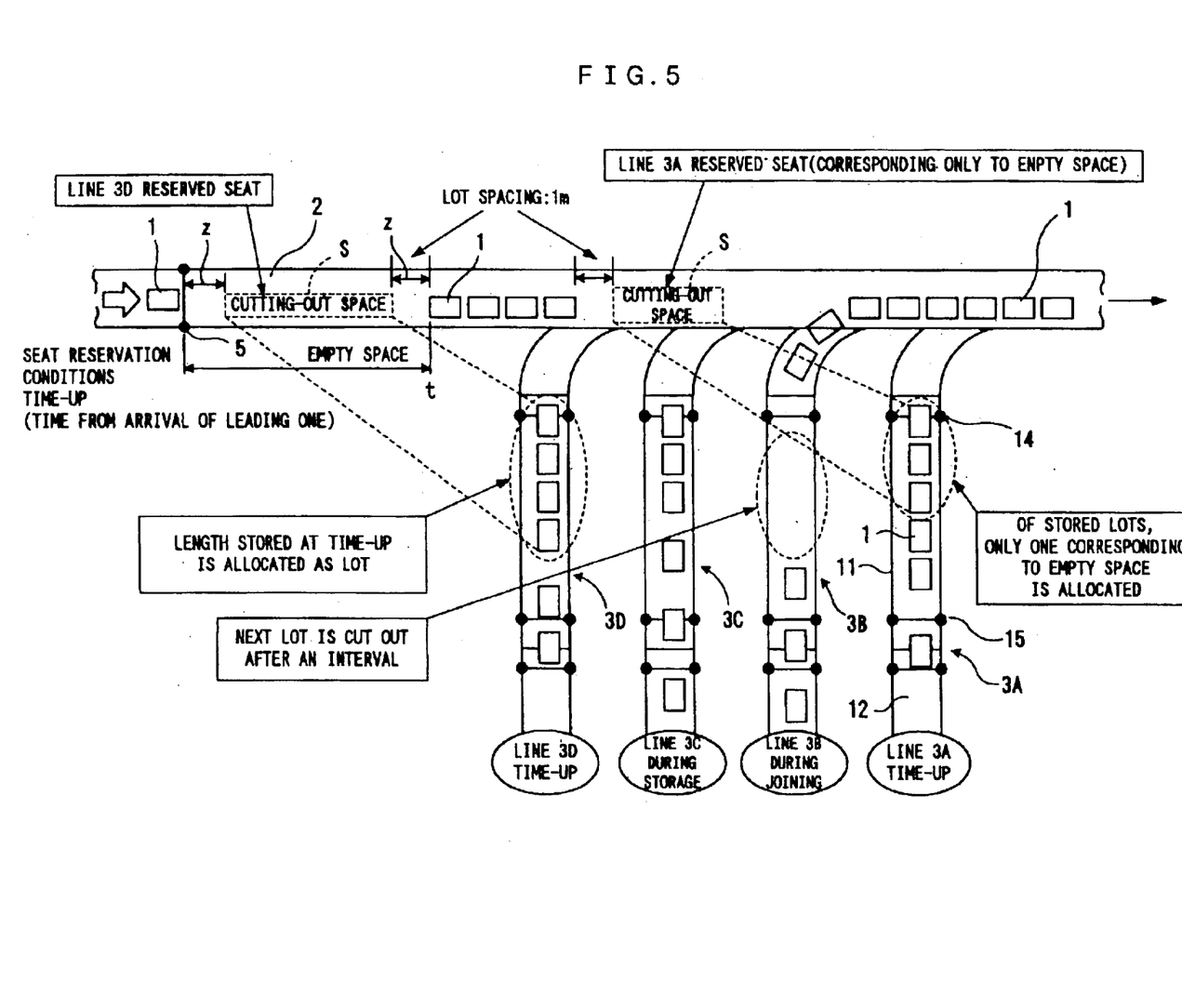
FIG. 5 is an explanatory view of the article joining control method for the conveyance system.

The operation of the above arrangement will be described with reference to FIG. 5.

On the main line 2, an empty space equal to or greater than a predetermined length (which is equal to the minimum storage length j plus the minimum set spacings z before and behind the same) between lots or between articles 1 on the main line 2 is detected upstream of the junction of the main line 2 with the article arrival line 3, whereby an empty space is found, which is distinct from a spacing between articles 1 in a lot and allows articles 1 between lots (or articles 1) to be joined thereto. With this empty space, it is possible to obtain a cutting-out space s which allows articles 1 to be actually joined thereto from the article arrival line 3 and a front position data t of the empty space.

On the other hand, on the article arrival line 3, after a lapse of a given time after storage of articles 1 on the cutting-out device 11 has started (or when the time becomes up), a right to join is created, and empty spaces which are successively produced are reserved on the article arrival lines 3 in the order of creation of the rights to join (reserve seats are set). In FIG. 5, reserved seats are set on the article arrival lines 3A and 3D.

Further, the storage length N on the cutting-out device 11 when the time becomes up is compared with the cutting-out space s in the empty space, and the cutting-out length L corresponding to the amount of articles 1 to be cut out is found (allocated as a lot). In FIG. 5, in the article arrival line 3A, three of the five stored articles 1 are allocated (two being left), and in the article arrival line 3D, all the stored articles 1 are allocated.

And when the reserved seat (empty space) arrives at the coordinates m upstream of the junction of the article arrival line 3 on which the reservation is made, a carrying-out signal including the cutting-out length L is outputted, and the articles 1 (a row thereof) corresponding to the length (the cutting-out length L) capable of being joined to the cutting-out space s by the cutting-out device 11 are cut out from the cutting-out device 11 in order for joining. In FIG. 5, the stored articles 1 are cut out from the article arrival line 3B and joined to the main line 2. At this point of time, the lot spacing is kept at the minimum set spacing z (1 m in FIG. 5).

As described above, empty spaces (spacings) which allow the detected articles 1 to be joined from the article arrival lines (auxiliary conveyance paths) 3 having articles 1 stored thereon are successively reserved, and when the reserved spacing approaches the junction, the articles 1 are cut out from the article arrival line 3 for joining.

Further, on the article arrival line 3, when a carrying-out signal is inputted, the carrying-in conveyor 12 is stopped for a given time to stop carrying articles 1 into the cutting-out device 11, and then a spacing is created for articles 1 subsequently carried in from the carrying-in conveyor 12. In FIG. 5, in the article arrival line 3B, the carrying-in conveyor 12 is stopped for a given time. Further, when the cutting-out device 11 becomes full, the carrying-in conveyor 12 is stopped, thus stopping carrying articles 1 into the cutting-out device 11.

In addition, when articles 1 corresponding to the length which was unable to be cut out, that is, the length (N–s), are left on the article arrival line 3, the counting of the timer is started again after the articles 1 left behind have been detected by the leading sensor 14. When the time is up, the right to join is created again to reserve a seat (an empty space which allows articles 1 to be joined).

Thus, when an empty space which can allow articles 1 to be joined is created between lots or between articles 1 on the main line 2, an amount of articles 1 corresponding to the cutting-out space s in this empty space is allocated and cut out from the article arrival line 3 for joining thereto. Therefore, empty spaces between rows of articles on the main line 2 can be reduced while securing the given minimum set spacing z between lots, increasing the joining efficiency. Further, storage of articles 1 on the article arrival line 3 is reduced and so is the waiting time for loading operation, whereby the efficiency of loading operation of articles 1 can be increased.

Further, when cutting out from the article arrival line 3 is executed, the carrying of articles 1 into the cutting-out device 11 of the article arrival line 3 that has executed cutting out is stopped. Then a spacing is created for articles 1 carried in from the carrying-in conveyor 12, which prolongs the time period until the time becomes up since the leading sensor 14 is actuated by articles 1 carried in. That is, the time for creation of the right to join is prolonged, so that successive cutting out of articles 1 from the article arrival line 3 to the main line 2 can be reduced. As a result, it is possible to prevent articles 1 from being successively cut out from one article arrival line (auxiliary conveyance path) 3 alone to the main line (main conveyance path) 2, thus preventing articles 1 from becoming unable to join from other article arrival lines 3.

In this embodiment, it is only after the time becomes up again that an empty space is allocated to articles 1 left at the time of cutting out. When such remaining of articles 1 occurs, however, an empty space to be created next may be immediately reserved without requiring time becomes up. That is, an empty space to be created next can be reserved on a priority basis for the article arrival line 3 where the remaining of articles 1 has-occurred.

Further, when articles 1 remain, reservation of an empty space reserved for another article arrival line 3 disposed upstream of the article arrival line 3 where the remaining of articles 1 has occurred may be canceled to allow the remaining articles 1 to be joined to this empty space on a priority basis.

FIG. 6 illustrates another embodiment.

Figure 6A:
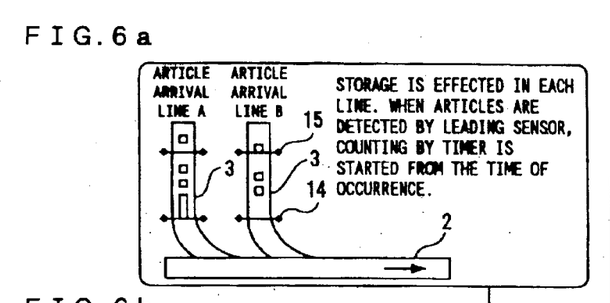
FIG. 6 is an explanatory view of an article joining control method according to another embodiment of the invention.

As shown in FIG. 6(a), in each article arrival line 3, when articles 1 are detected by the leading sensor 14, the timer starts counting.

Figure 6B:
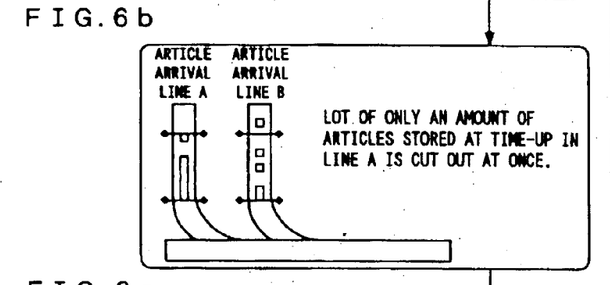
Figure 6C:
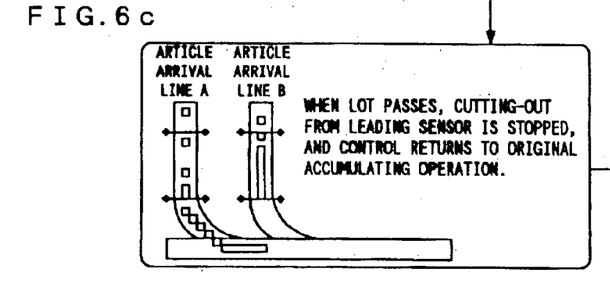

When the timer reaches a time-up point in the article arrival line 3A, a lot of amount or articles stored on an article arrival line 3A is cut out to the main line 2, as shown in FIG. 6(b), and when the lot passes, cutting out is stopped and the control returns to the original accumulating operation, as shown in FIG. 6(c).

Figure 6D:
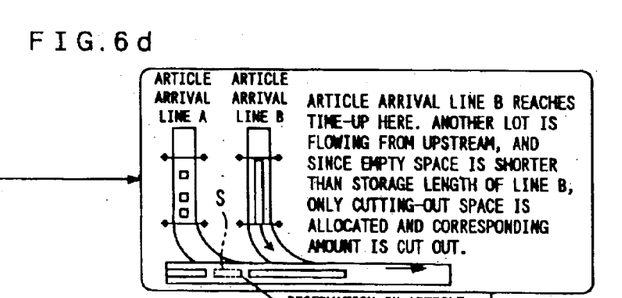
Figure 6E:
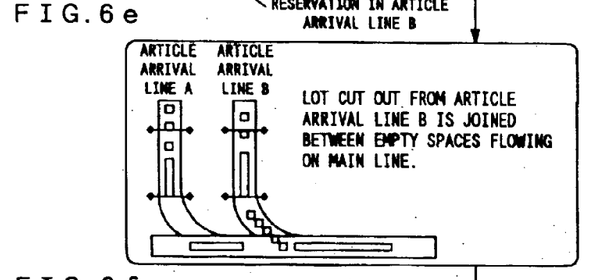
Figure 6F:
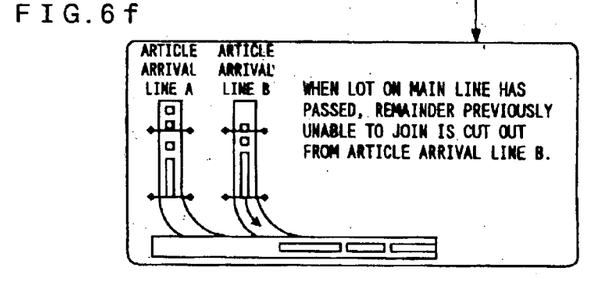

Further, when the timer reaches a time-up point in the article arrival line 3(B), the cutting-out space s in the empty space reserved for the article arrival line 3(B) is less than the length of the stored articles 1, as shown in FIG. 6(d), so that the articles 1 corresponding in amount to the cutting-out spaces are allocated, and as shown in FIG. 6(e), the allocated articles 1 are cut out from the article arrival line 3(B) to the main line 2 and joined to the empty space. And the next empty space is reserved for the article arrival line 3(B) where the remaining of articles 1 has occurred, and when the lot on the main line 2 passes, the remaining articles 1 are cut out from the article arrival line 3(B) to the main line 2, as shown in FIG. 6(f).

Thus, the remaining articles 1 which, in the article arrival line 3(B), were unable to join are joined on a priority basis from the article arrival line 3(A) to the main line 2.

In the present embodiment, the time-up period T needed from the time the leading sensor 14 is actuated till the time becomes up is the same in the article line control sections 23, 24, 25 and 26 in the article arrival lines 3, however, it may be possible to adjust this time-up period T for each of the article line control sections 23, 24, 25 and 26. At this point of time, if the time-up period T for the article arrival line 3 having the largest amount of articles 1 being carried in is shortened, the right to join is created earlier, so that the chances for articles 1 to join from this article arrival line 3 to the main line 2 are increased, reducing the storage of articles 1 in this article arrival line 3, increasing the efficiency of operation of loading articles 1 to the article arrival line 3 having the largest amount of articles 1 being carried in.

Further, in the present embodiment, an empty space between lots is found by using the upstream passage sensor 5, however, an industrial camera may be installed on the main line 2 to find an empty space based on image data obtained by the camera.

What is claimed is:

1. An article joining control method for joining articles conveyed and stored in a plurality of auxiliary conveyance paths for storing therein a plurality of articles, from said plurality of auxiliary conveyance paths to a main conveyance path conveying articles, in which when a spacing equal to or greater than a predetermined length is detected between articles or between groups of articles being conveyed on the main conveyance path, the stored articles corresponding to the length of the spacing are cut out from the auxiliary conveyance paths to the main conveyance path, characterized in that:

when it is confirmed that articles are stored at a position in close proximity to a junction with the main conveyance path and a time-up period lapses, each auxiliary conveyance path reserves a detected spacing in the main conveyance path, subsequently when this reserved spacing approaches the junction, the articles corresponding to the spacing in size are cut out from one of the auxiliary conveyance paths and joined to the spacing; and when it is impossible to cut out all of the articles stored in said one auxiliary conveyance path to the reserved spacing, said one auxiliary conveyance path cancels a spacing reserved by another of the auxiliary conveyance paths on an upstream side of said one auxiliary conveyance path, and reserves for said one auxiliary conveyance path the canceled spacing in the main conveyance path.

2. An article joining control method as set forth in claim 1, characterized in that:

the spacing equal to or greater than a predetermined length is a spacing equal to a spacing preset between the groups of articles in a before-and-behind relation plus a minimum length of the stored article.

3. An article joining control method as set forth in claim 1, characterized in that:

when the articles have been cut out from said one auxiliary conveyance path and joined to the main conveyance path, carrying and storing articles into and in said one auxiliary conveyance path is stopped for a given time.

4. An article joining control method for joining articles conveyed and stored in a plurality of auxiliary conveyance paths for storing therein a plurality of articles, from said plurality of auxiliary conveyance paths to a main conveyance path conveying articles, in which when a spacing equal to or greater than a predetermined length is detected between articles or between groups of articles being conveyed on the main conveyance path, the stored articles corresponding to the length of the spacing are cut out from the auxiliary conveyance paths to the main conveyance path, characterized in that:

when it is confirmed that articles are stored at a position in close proximity to a junction with the main conveyance path and a time-up period lapses, each auxiliary conveyance path reserves a detected spacing in the main conveyance path, subsequently when this reserved spacing approaches the junction, the articles corresponding to the spacing in size are cut out from one of the auxiliary conveyance paths and joined to the spacing; and when it is impossible to cut out all of the articles stored in said one auxiliary conveyance path to the reserved spacing, said one auxiliary conveyance path immediately reserves a detected spacing in the main conveyance path without necessitating the time-up period upon confirming that articles are stored at the position in close proximity to the junction with the main conveyance path.

5. An article joining control method as set forth in claim 4, characterized in that:

the spacing equal to or greater than a predetermined length is a spacing equal to a spacing preset between the groups of articles in a before-and-behind relation plus a minimum length of the stored article.

6. An article joining control method as set forth in claim 4, characterized in that:

when the articles have been cut from said one auxiliary conveyance path and joined to the main conveyance path, carrying and storing articles into and in said one auxiliary conveyance path is stopped for a given time.

* * * * *